United States Patent
Amidi

(10) Patent No.: US 8,059,882 B2
(45) Date of Patent: Nov. 15, 2011

(54) APPARATUS AND METHOD FOR CAPTURING INFORMATION DURING ASSET INSPECTIONS IN A PROCESSING OR OTHER ENVIRONMENT

(75) Inventor: Soroush Amidi, Montreal (CA)

(73) Assignee: Honeywell International Inc., Morristown, NJ (US)

( * ) Notice: Subject to any disclaimer, the term of this patent is extended or adjusted under 35 U.S.C. 154(b) by 1036 days.

(21) Appl. No.: 11/824,751

(22) Filed: Jul. 2, 2007

(65) Prior Publication Data

US 2009/0010484 A1   Jan. 8, 2009

(51) Int. Cl.
*G06K 9/00* (2006.01)
(52) U.S. Cl. ....................................................... 382/141
(58) Field of Classification Search .................. 382/141, 382/313, 181; 345/2.1, 2.2, 2.3; 705/1–4, 705/21, 22, 305
See application file for complete search history.

(56) References Cited

U.S. PATENT DOCUMENTS

| | | | |
|---|---|---|---|
| 5,926,103 A | 7/1999 | Petite | |
| 5,995,936 A | 11/1999 | Brais et al. | |
| 6,116,815 A | 9/2000 | Chen | |
| 6,192,257 B1* | 2/2001 | Ray | 455/566 |
| 6,317,039 B1* | 11/2001 | Thomason | 340/505 |
| 6,415,646 B1 | 7/2002 | Kessel et al. | |
| 6,499,016 B1 | 12/2002 | Anderson | |
| 6,721,001 B1 | 4/2004 | Berstis | |
| 6,775,625 B2* | 8/2004 | Burkhardt et al. | 702/35 |
| 7,347,781 B2* | 3/2008 | Schultz | 463/42 |
| 2002/0198997 A1* | 12/2002 | Linthicum et al. | 709/227 |
| 2004/0105006 A1 | 6/2004 | Lazo et al. | |
| 2004/0145485 A1 | 7/2004 | Tice | |
| 2005/0062677 A1 | 3/2005 | Nixon et al. | |
| 2005/0182650 A1* | 8/2005 | Maddox et al. | 705/1 |
| 2006/0176169 A1 | 8/2006 | Doolin et al. | |
| 2006/0255265 A1 | 11/2006 | Dalzell | |
| 2007/0132576 A1 | 6/2007 | Kolavennu et al. | |
| 2007/0132577 A1 | 6/2007 | Kolavennu | |
| 2007/0132637 A1 | 6/2007 | Kolavennu et al. | |

(Continued)

FOREIGN PATENT DOCUMENTS

DE   3634628   4/1987

(Continued)

OTHER PUBLICATIONS

"PanOS Platform, Unified Location Management Platform," PanGo, 2007, 2 pages.

(Continued)

*Primary Examiner* — Daniel Mariam
(74) *Attorney, Agent, or Firm* — Munck Carter, LLP

(57) ABSTRACT

An asset information collection device can be used during inspections of assets in a processing, production, or other system. The asset information collection device includes at least one image capture unit configured to capture images of assets, such as a video capture unit and a photo capture unit. The asset information collection device also includes a sound capture unit configured to capture audio information associated with the assets, such as oral notes made by an inspector. The asset information collection device further includes a controller configured to associate the captured images and audio information with particular ones of the assets. In addition, the asset information collection device includes at least one interface, such as a wireless transceiver, configured to wirelessly transmit the captured images and audio information and information identifying the associations to an external destination.

24 Claims, 4 Drawing Sheets

U.S. PATENT DOCUMENTS

| | | |
|---|---|---|
| 2007/0205886 A1 | 9/2007 | Huseth et al. |
| 2007/0241965 A1 | 10/2007 | Kolavennu et al. |
| 2007/0268884 A1 | 11/2007 | Kolavennu et al. |
| 2008/0177665 A1* | 7/2008 | Noordam .................. 705/50 |
| 2008/0180319 A1* | 7/2008 | Islam et al. ............ 342/357.09 |
| 2008/0208962 A1* | 8/2008 | Kim et al. .................... 709/203 |

FOREIGN PATENT DOCUMENTS

| | | |
|---|---|---|
| EP | 1501029 A2 | 1/2005 |
| EP | 1 657 610 A2 | 5/2006 |
| EP | 1657610 A2 | 5/2006 |
| JP | 2004128541 | 4/2004 |
| WO | WO 2004057325 A1 | 7/2004 |
| WO | WO 2008/067236 A2 | 6/2008 |

OTHER PUBLICATIONS

"Ekahau T301-A Wi-Fi Tag," ekahau, 2007, 2 pages.

"Improve Maintenance Efforts with DocuMint," Honeywell, Feb. 2006, 3 pages.

"Lumidor Minimax XT," Honeywell, Dec. 2005, 4 pages.

Soroush Amidi, U.S. Appl. No. 11/606,834, filed Nov. 29, 2006, "Apparatus and Method for Monitoring Hazardous Materials in a Processing or Other Environment".

Soroush Amidi, U.S. Appl. No. 11/606,814, filed Nov. 29, 2006, "Apparatus and Method for Inspecting Assets in a Processing or Other Environment".

"n-sight: The Mobile Video Collaboration System (MVCS)", LibreStream, 2007, 5 pages.

"IntelaTrac PKS Redefines Field Data Collection and Management," Honeywell, Feb. 2006, 2 pages.

Honeywell Process Solutions, "IntelaTrac PKS," Honeywell, Sep. 9, 2006, 2 pages.

* cited by examiner

APPARATUS AND METHOD FOR CAPTURING INFORMATION DURING ASSET INSPECTIONS IN A PROCESSING OR OTHER ENVIRONMENT

TECHNICAL FIELD

This disclosure relates generally to inspection systems and more specifically to an apparatus and method for capturing information during asset inspections in a processing or other environment.

BACKGROUND

Processing environments often include a large number of assets as well as many differing types of assets. Example processing environments include manufacturing plants, chemical plants, crude oil refineries, ore processing plants, and mines. Example assets include valves, motors, pipes, gauges, vessels, and any other of a wide variety of devices or components.

The assets in a processing environment may be inspected routinely, such as during safety or reliability inspections, to ensure proper operation of the assets or to detect potential problems with the assets. Inspectors routinely carry various objects, such as notepads and digital cameras, that are used to record information about the assets being inspected. Inspectors also routinely carry mobile telephones or other communication devices allowing the inspectors to contact other personnel and discuss issues identified in the processing environment.

SUMMARY

This disclosure provides an apparatus and method for capturing information during asset inspections in a processing or other environment.

In a first embodiment, an apparatus includes at least one image capture unit configured to capture images (such as photographic images and/or video images) of assets. The apparatus also includes a sound capture unit configured to capture audio information associated with the assets. The apparatus further includes a controller configured to associate the captured images and audio information with particular ones of the assets. In addition, the apparatus includes at least one interface configured to wirelessly transmit (i) the captured images and audio information and (ii) information identifying the associations of the captured images and audio information with the particular assets.

In particular embodiments, the controller is configured to associate the captured images and audio information with the particular assets based on input from a user.

In other particular embodiments, the apparatus includes a speaker. The controller is also configured to receive first voice data from the sound capture unit and provide the first voice data to the at least one interface for wireless transmission. The controller is further configured to receive second voice data from the at least one interface and provide the second voice data to the speaker.

In yet other particular embodiments, the controller is further configured to receive additional information associated with the assets from the at least one interface. The additional information could include test readings from a non-destructive testing instrument, and the at least one interface may be configured to communicate with the non-destructive testing instrument.

In still other particular embodiments, the apparatus includes one or more controls configured to provide input to the apparatus from a user. The one or more controls could include a touch-sensitive display configured to receive the input from the user. The input from the user could include at least one of: (i) annotations drawn on the images presented on the display and (ii) selections of assets in a list presented on the display, the selections identifying the associations of the captured images and audio information with the particular assets.

In a second embodiment, a method includes capturing images and audio information associated with multiple assets. The method also includes associating the captured images and audio information with particular ones of the assets. The method further includes wirelessly communicating (i) the captured images and audio information and (ii) information identifying the associations of the captured images and audio information with the particular assets.

In a third embodiment, a computer program is embodied on a computer readable medium. The computer program includes computer readable program code for capturing images and audio information associated with multiple assets. The computer program also includes computer readable program code for associating the captured images and audio information with particular ones of the assets. The computer program further includes computer readable program code for initiating wireless communication of (i) the captured images and audio information and (ii) information identifying the associations of the captured images and audio information with the particular assets.

In a fourth embodiment, a method includes receiving images and audio information associated with assets. The method also includes associating the received images and audio information with specific ones of the assets. In addition, the method includes storing the images and audio information in association with the specific ones of the assets.

In particular embodiments, multiple images and multiple audio information are associated with each asset.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
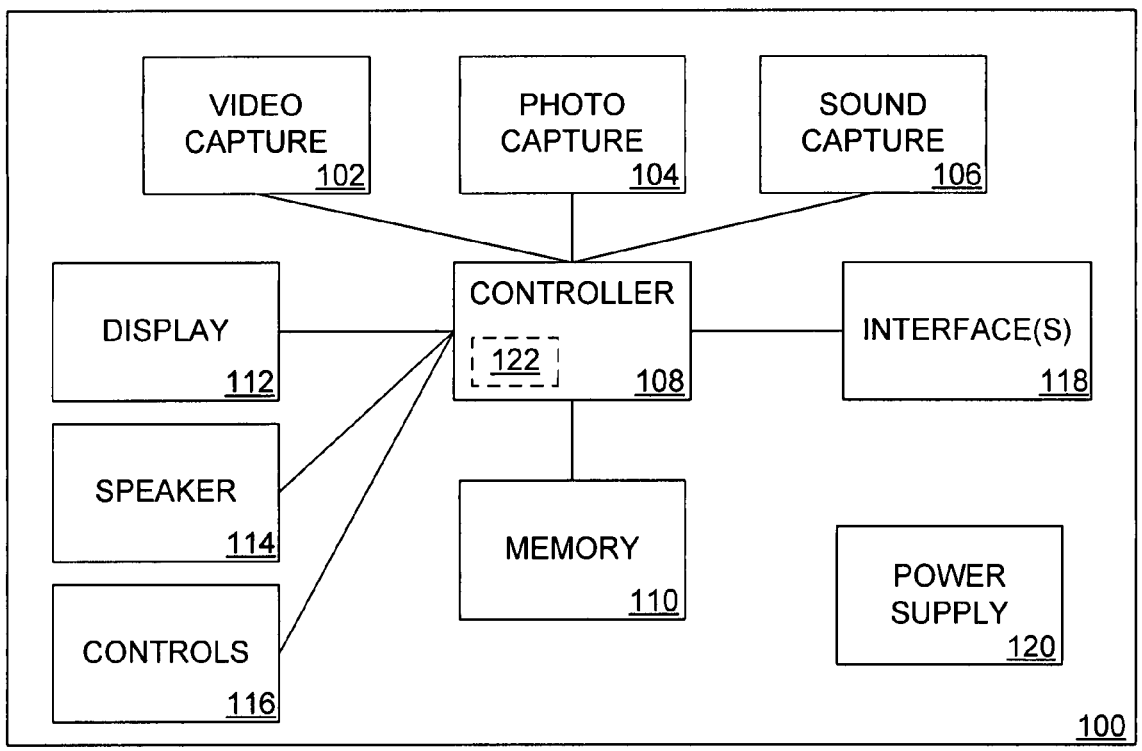
FIG. 1 illustrates an example asset information collection device according to one embodiment of this disclosure.

FIG. 1 illustrates an example asset information collection device 100 according to one embodiment of this disclosure. The embodiment of the asset information collection device 100 shown in FIG. 1 is for illustration only. Other embodiments of the asset information collection device 100 may be used without departing from the scope of this disclosure.

In this example, the asset information collection device 100 collects data related to one or more assets in a processing or other environment. This data could include photographs, video sequences, voice or other sound recordings, and handwritten or typed notes from a user. The asset information collection device 100 can associate this data with a particular asset and communicate this data to an external system, which can associate the data with the correct asset and store the data. The asset information collection device 100 could also allow a user to communicate with other individuals, such as by supporting two-way radio or other wireless voice communications. In this way, accurate and reliable information about an asset can be obtained and associated with the assets for later use. Moreover, the user of the asset information collection device 100 is able to maintain contact with other individuals, enabling the user to obtain support while performing an asset inspection.

In this example, the asset information collection device 100 includes a video capture unit 102 and a photo capture unit 104. The video capture unit 102 captures video sequences of digital images, while the photo capture unit 104 captures individual still digital images. These capture units 102-104 allow a user to capture digital photographs or video sequences of assets in a processing or other environment. The "assets" could represent any suitable devices or components in a manufacturing, production, or other processing system. The video capture unit 102 includes any suitable structure for capturing sequences of images, and the photo capture unit 104 includes any suitable structure for capturing individual images. In some embodiments, the capture units 102-104 could be combined into a single functional unit, such as a low-resolution or other digital camera that is capable of capturing both still images and short video sequences. Each of the capture units 102-104 could capture images at any suitable resolution(s).

The asset information collection device 100 also includes a sound capture unit 106 that captures voices or other sounds. The sound capture unit 106 allows, for example, the asset information collection device 100 to capture voice recordings from the user who is inspecting an asset. As a particular example, the sound capture unit 106 could be used to capture the user's vocal comments regarding the condition of an asset or any problems noted with the asset during an inspection. The sound capture unit 106 could also be used to capture sounds associated with the operation of the asset. The sound capture unit 106 could further be used to capture the user's voice when the user is using a two-way radio or other wireless communication feature of the asset information collection device 100. The sound capture unit 106 includes any suitable structure for capturing voice or other sounds. The sound capture unit 106 could, for example, represent a low-quality recording device, although the sound capture unit 106 could support any suitable recording quality.

A controller 108 is coupled to the capture units 102-106. The controller 108 performs various functions related to the operation of and control over the asset information collection device 100. For example, the controller 108 could receive digital still or video images and digitized sound recordings from the capture units 102-106 and store this data in a memory 110. The controller 108 could also facilitate communication of the digital images and digitized sound recordings to an external system. The controller 108 could further interact with a user via one or more input/output elements of the asset information collection device 100, such as to collect additional data associated with an asset or to allow the user to associate specific data with a specific asset. In addition, the controller 108 could facilitate two-way radio or other wireless communication sessions involving the asset information collection device 100. The controller 108 includes any hardware, software, firmware, or combination thereof for performing various control or other operations in the asset information collection device 100. The controller 108 could, for example, represent a microprocessor, digital signal processor, application specific integrated circuit (ASIC), or field programmable gate array (FPGA).

The memory 110 stores various information used, generated, or collected by the asset information collection device 100. For example, the memory 110 could include one or more memories storing instructions and data used by the controller 108 to perform various functions, such as various applications executed by the controller 108. The memory 110 may also include one or more memories storing digital photographs, video sequences, sound recordings, and other asset-related data. The memory 110 includes any suitable volatile and/or non-volatile storage and retrieval device or devices.

The asset information collection device 100 also includes various input/output elements, such as a display 112. The display 112 includes any suitable structure for presenting information to a user, such as a liquid crystal display (LCD). The display 112 could be used, for example, to present information associated with an asset to the user. The display 112 could also be used to collect information associated with an asset from the user, such as by presenting a form to the user that requests certain information be provided by the user. The display 112 could further be used to present the user with a list of assets, allowing the user to select which asset is associated with particular data. As a particular example, the asset list displayed to the user could represent an asset tree provided by EXPERION PKS from HONEYWELL INTERNATIONAL INC. In addition, the display 112 could represent a touch-screen or other touch-sensitive or input-receiving display, such as a display that senses strokes from a stylus and converts the strokes into input data.

A speaker in the asset information collection device 100 presents audio information to a user. For example, when operating as a two-way radio or in another voice communication mode, the asset information collection device 100 could receive digitized voice data over a wireless communication link, and the speaker 114 could convert the digitized voice data into audible sounds. The speaker 114 could present other audible information to the user, such as automated speech associated with operation of the asset information collection device 100 (like warnings or help information stored in the memory 110). The speaker 114 includes any suitable structure for presenting audible information to a user.

The asset information collection device 100 further includes various controls 116. The controls 116 include any suitable structure(s) allowing the user to control or adjust the operation of the asset information collection device 100. For example, the controls 116 could include buttons for initiating the capture of a digital image or a video sequence or the recording of the user's voice or other sound. Buttons could also be used to enter alphanumeric text into the asset information collection device 100 or to navigate menus, tables, or other objects displayed by the asset information collection device 100. The controls 116 could represent physical controls separate from the display 112 or soft controls presented to the user on the display 112.

In this example, the asset information collection device 100 further includes one or more interfaces 118. The interfaces 118 allow the asset information collection device 100 to communicate, transmit, and receive information to and from one or more external devices or systems. For example, an interface 118 may allow the controller 108 to transmit digital photographs, video sequences, sound recordings, and other data stored in the memory 110 to an external system for storage and analysis. This could occur wirelessly or via a physical connection, such as when the asset information collection device 100 is inserted into a docking station. As another example, an interface 118 may allow the controller 108 to receive information from an asset being inspected, such as radio frequency identification (RFID) information from an asset tag identifying a particular asset. This may allow the asset information collection device 100 to automatically identify the asset with which data being collected is associated. As yet another example, an interface 118 may allow the controller 108 to provide a Voice over Internet Protocol (VoIP) or other voice communication session between a user of the asset information collection device 100 and another individual's communication device (such as another asset information collection device 100 or mobile telephone). Each interface 118 represents any suitable structure supporting wired or wireless communications, such as a radio frequency (RF) transceiver.

In addition, the asset information collection device 100 includes a power supply 120. The power supply 120 supplies power to various components in the asset information collection device 100. The power supply 120 could represent any suitable source of operating power, such as a battery, solar cell, or fuel cell. In some embodiments, the power supply 120 may be capable of supplying power to the asset information collection device 100 for an extended period of time.

In one aspect of operation, the asset information collection device 100 represents a portable device, such as a device carried by an inspector in a processing or other environment. The capture units 102-104 can be used to collect digital photographs and video sequences of assets, while the sound capture unit 106 can be used to collect the inspector's oral notes or other sounds associated with the assets. The controller 108 can collect and transmit this data to an external system in real-time or near real-time, or the data can be stored in the memory 110 for later retrieval. Other configurations or modes of operation of the asset information collection device 100 could also be used depending on the implementation. In particular embodiments, the controller 108 executes or supports one or more applications 122. These applications 122 perform or support various functions implemented by the asset information collection device 100, such as the collection of asset information or the exchange of VoIP traffic.

The following represents one example of how the asset information collection device 100 could be used. In this example use, during a maintenance inspection of an asset, an inspector uses the asset information collection device 100 to capture video, photographic, and audio data related to the asset. Other types of data related to the asset could also be captured by the asset information collection device 100, such as readings from non-destructive testing (NDT) instruments received through an interface 118. The inspector can also use the device 100 to associate the data with a particular asset being inspected in real-time. The data could, for example, be associated with a particular asset using a plant asset management (PAM) application or a reliability application 122 executed by the controller 108. As a particular example, data can be associated with a particular asset using ASSET MANAGER PKS from HONEYWELL INTERNATIONAL INC. The data is also sent wirelessly from the asset information collection device 100 in the field to a server or other destination for storage or analysis. This allows the inspector to capture photographs, video sequences, audio data, written observations, and other data electronically on the device 100, to associate the data with an asset, and to send the data to an intended destination.

As a more specific example of how the asset information collection device 100 could be used, during an inspection of a heat exchanger, an inspector might notice some physical damage to the heat exchanger. Using the asset information collection device 100, the inspector may capture a small video sequence of the heat exchanger and take a still photograph of the physical damage. Using the display 112 and a stylus, the inspector can draw a circle around the physical damage, write a note on the still photograph, or provide other annotations. The inspector uses the controls 116 to associate the photograph and video sequence with the particular asset (the heat exchanger), and the data is transmitted to and stored in a remote destination, such as a reliability database. The inspector can also perform NDT or other testing, which produces test readings captured by INTELATRAC software executing on the controller 108. The test data is wirelessly transmitted for storage, such as in an INTELATRAC database. In addition, using VoIP or other wireless voice communications, the inspector may contact a supervisor or other personnel and ask for advice. For instance, using the video capability of the device 100, the inspector may communicate with a more-experienced maintenance engineer, who can view the physical damage (using the data provided by the asset information collection device 100) and recommend a course of action without actually being in the field. The maintenance engineer can ask the inspector for additional verifications or tests, and the inspector can create additional tasks using the INTELATRAC software. The maintenance engineer could also send data to the asset information collection device 100, such as additional tasks to be performed by the inspector. The inspector can then complete the additional tasks and any remaining inspection tasks that are identified by the INTELATRAC software, and additional data associated with the heat exchanger can be wirelessly transmitted for storage in the appropriate location(s).

In this way, one or more external systems can receive (either in real-time or non-real-time) information associated with the inspection of one or more assets. This allows the external systems to perform various functions, such as associating data with assets, identifying potential problems with assets, ensuring that required inspections of assets have been performed, and determining the wear of a particular asset over time. The external systems could use this data in any other or additional manner, such as to identify any other or additional characteristics of the assets. Moreover, by supporting two-way radio or other wireless voice communications, the user of the asset information collection device 100 can stay in contact with various other personnel as needed.

Although FIG. 1 illustrates one example of an asset information collection device 100, various changes may be made to FIG. 1. For example, the asset information collection device 100 could include any number of each individual component, such as multiple displays or memories. Also, the functional division shown in FIG. 1 is for illustration only. Various components in FIG. 1 could be combined or omitted and additional components could be added according to particular needs. As a particular example, the controller 108 could form part of the capture unit 102 and/or 104 (such as by processing image data to generate files representing images) or part of the sound capture unit 106 (such as by sampling digitized speech).

Figure 2:
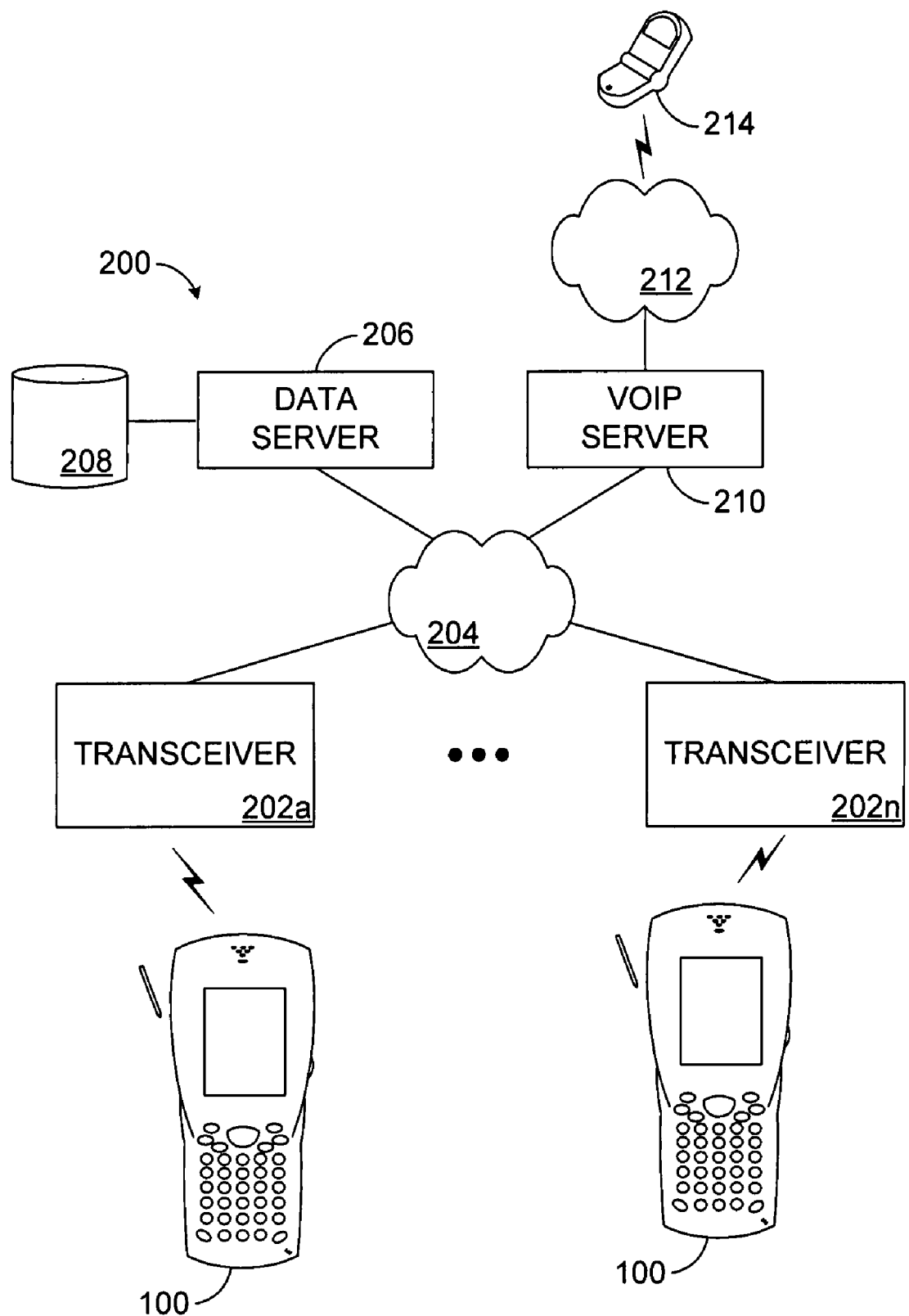
FIG. 2 illustrates an example system for collecting information from asset information collection devices according to one embodiment of this disclosure.

FIG. 2 illustrates an example system 200 for collecting information from asset information collection devices according to one embodiment of this disclosure. The embodiment of the system shown in FIG. 2 is for illustration only. Other embodiments of the system 200 may be used without departing from the scope of this disclosure.

As shown in FIG. 2, the system 200 collects data from one or more asset information collection devices 100. In this example, the asset information collection devices 100 take the form of handheld devices similar to mobile telephones. In this example, each of the asset information collection devices 100 includes a display in the upper portion of the device 100. Each of the asset information collection devices 100 also includes buttons (controls) in the lower portion and along the sides of the device 100. Each of the asset information collection devices 100 further includes a speaker and microphone in appropriate locations for facilitating two-way radio or other bi-directional voice communications using the device 100. In addition, each of the asset information collection devices 100 includes a stylus that can be used to provide input to the device 100 graphically using the display.

In this example embodiment, the asset information collection devices 100 communicate wirelessly with one or more transceivers 202a-202n. The transceivers 202a-202n could be distributed across a processing or other environment and are used to communicate with the asset information collection devices 100. Each of the transceivers 202a-202n includes any suitable structure for transmitting information to or receiving information from the asset information collection devices 100. The transceivers 202a-202n could, for example, represent RF transmitters and receivers.

In some embodiments, the transceivers 202a-202n transmit beacon signals or other signals to the asset information collection devices 100, which allow the asset information collection devices 100 to identify the presence of the transceivers 202a-202n. The asset information collection devices 100 can then transmit data collected by the devices 100 to the identified transceivers 202a-202n. In other embodiments, the asset information collection devices 100 could transmit signals and receive responses from any nearby transceivers 202a-202n, allowing the devices 100 to identify the transceivers and then transmit asset data to those transceivers. In still other embodiments, the asset information collection devices 100 could broadcast collected data for receipt by any nearby transceivers 202a-202n. Any other or additional communication scheme could be used to facilitate communication between the transceivers 202a-202n and the asset information collection devices 100.

The transmission of data to the transceivers 202a-202n could occur in any suitable manner. For example, an asset information collection device 100 could wait for a user to indicate that transmission of collected data is allowed or desired, or the asset information collection device 100 could automatically transfer all or a subset of the collected data. In this way, the transceivers 202a-202n may allow real-time or near real-time collection of data from the asset information collection devices 100.

In this example, the transceivers 202a-202n are coupled to a network 204. The network 204 facilitates communication between various components in the system 200. For example, the network 204 may communicate Internet Protocol (IP) packets, frame relay frames, Asynchronous Transfer Mode (ATM) cells, or other suitable information between network addresses. The network 204 may include one or more local area networks (LANs), metropolitan area networks (MANs), wide area networks (WANs), all or a portion of a global network such as the Internet, or any other communication system or systems at one or more locations.

A data server 206 is coupled to the network 204. The data server 206 receives and collects the asset data provided by the asset information collection devices 100. The data server 206 can also associate the received data with particular assets (such as by storing an asset's data in data structures associated with that asset). This association performed by the data server 206 could be based on the users' associations of asset data to particular assets made on the asset information collection devices 100. In other embodiments, this association can be performed by the data server 206 using information available to the data server 206, such as information from an RFID tag on the asset being inspected, an enterprise resource planning (ERP) system, a maintenance management system, EXPERION's Entreprise Model, ASSET MANAGER PKS, or DIGITAL VIDEO MONITOR (DVM) from HONEYWELL INTERNATIONAL INC.

The data server 206 can perform any other of a wide variety of functions using the data from the asset information collection devices 100, such as analyzing the data to identify any characteristics or problems with the assets. The data server 206 could represent any suitable computing device executing any suitable applications, such as reliability software, EXPERION software, or INTELATRAC software.

The data collected by the data server 206 could be stored in a database 208. The database 208 represents any suitable structure capable of storing and facilitating retrieval of information. The database 208 may also use any of a variety of data structures, arrangements, and compilations to store and facilitate retrieval of information. While shown as residing outside of and being coupled directly to the server 206, the database 208 could reside in any location or locations accessible by the server 206.

In this example, a VoIP server 210 is also coupled to the network 204. The VoIP server 210 supports VoIP communications to and from the asset information collection devices 100. For example, the VoIP server 210 could receive audio data from one asset information collection device 100 and route the audio data to another asset information collection device 100. The VoIP server 210 could also receive audio data from an asset information collection device 100 and route the audio data over a network 212 to one or more communication devices 214. The VoIP server 210 could further receive audio data from a communication device 214 and route the audio data over the network 204 to an asset information collection device 100. The VoIP server 210 could represent any suitable computing device executing any suitable applications supporting VoIP communications. Also, the communication devices 214 could represent any suitable devices capable of transmitting and/or receiving audio data, such as mobile telephones or two-way radios.

Although FIG. 2 illustrates one example of a system 200 for collecting information from asset information collection devices 100, various changes may be made to FIG. 2. For example, the layout and arrangement of the system 200 could vary, and any number of asset information collection devices, transceivers, networks, servers, databases, and communication devices could be used. Also, components could be combined or omitted and additional components could be added according to particular needs. As a particular example, the networks 204 and 212 could represent the same network, where the communication devices 214 communicate with the VoIP server 210 via the transceivers 202a-202n. In addition, the asset information collection devices 100 could be used in any other suitable system.

Figure 3:
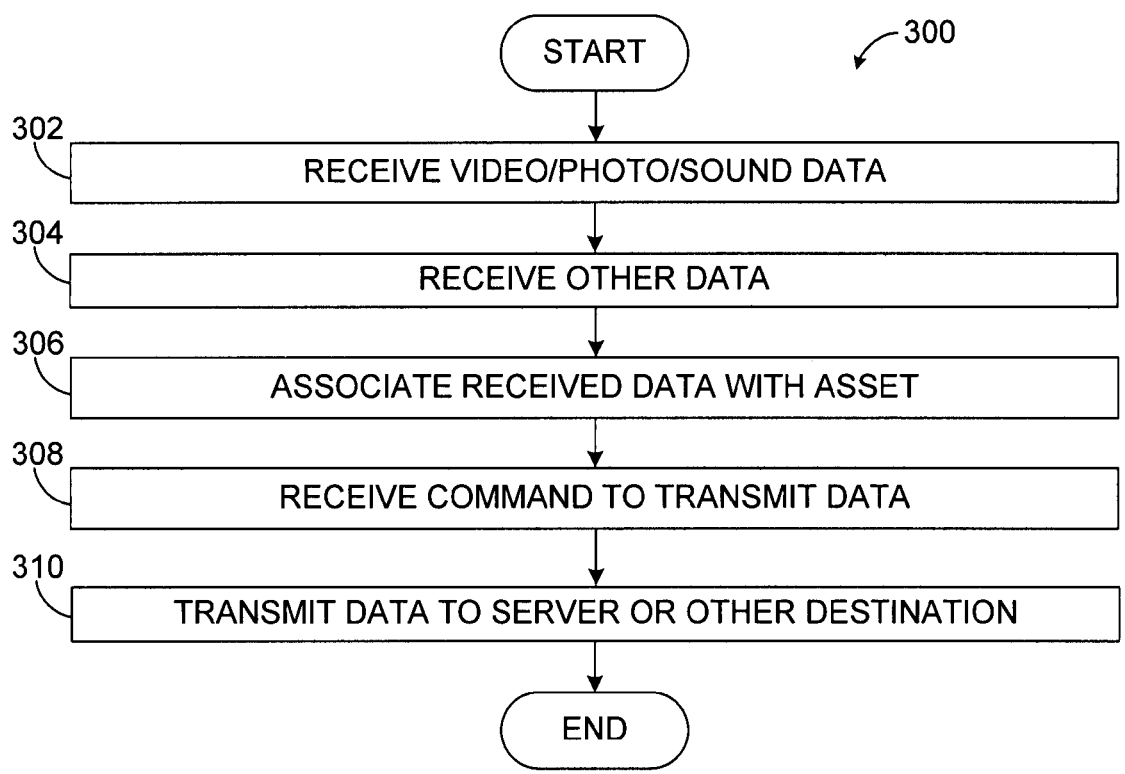
FIG. 3 illustrates an example method for collecting information at an asset information collection device according to one embodiment of this disclosure.

FIG. 3 illustrates an example method 300 for collecting information at an asset information collection device according to one embodiment of this disclosure. The embodiment of the method 300 shown in FIG. 3 is for illustration only. Other embodiments of the method 300 may be used without departing from the scope of this disclosure. Also, for ease of explanation, the method 300 in FIG. 3 is described with respect to the asset information collection device 100 of FIG. 1 operating in the system 200 of FIG. 2. The method 300 could be used with any other suitable device and in any other suitable system.

As shown in FIG. 3, video, photographic, and audio data is received at step 302. This could include a user using the video capture unit 102 in an asset information collection device 100 to capture a video segment of an asset being inspected. This could also include the user using the photo capture unit 104 in the asset information collection device 100 to take a digital picture of the asset being inspected. This could further include the user using the sound capture unit 106 in the asset information collection device 100 to record oral notes or other sounds during an inspection.

Other data associated with an asset could be received at step 304. This could include the user using a form or other document presented on the display 112 of the asset information collection device 100 to check off items in a checklist, enter data using a physical or soft keyboard or number pad, or enter data using a stylus. The forms or other documents presented to the user could vary based on the asset or type of asset being inspected. This could also include the asset information collection device 100 receiving data associated with the asset from an external source, such as from one or more NDT instruments.

The received data is associated with an asset at step 306. This could include, for example, the asset information collection device 100 presenting the user with a list of assets and the user selecting one of the assets in the list. This could also include the asset information collection device 100 receiving information from an external source and automatically associating data with an asset. The external source could, for example, represent information from an RFID tag on the asset being inspected.

A command to transmit the data is received at step 308. This could include, for example, the user indicating that an inspection of the asset is complete or that transmission of the collected data is desired. This command could be received in any suitable manner, such as a selection of a menu item presented on the display 112 or a selection of an appropriate button on the asset information collection device 100. The data could be transmitted in response to any other suitable trigger, such as a specified amount of time elapsing.

The collected data is transmitted at step 310. This could include the controller 108 communicating the collected data from the memory 110 to one or more transceivers 202a-202n for delivery to an appropriate destination, such as the data server 206. This could also include the controller 108 communicating information identifying the associations of the collected data to the asset.

In this way, the asset information collection device 100 can be used to collect various data associated with an asset and to provide the data in real-time or near real-time to a suitable destination. The asset information collection device 100 can also be used as described above to support other functions, such as voice communication sessions or receipt of tasks or other data from other personnel, as desired.

Although FIG. 3 illustrates one example of a method 300 for collecting information at an asset information collection device 100, various changes may be made to FIG. 3. For example, while shown as a series of steps, various steps in FIG. 3 could overlap, occur in a different order, occur in parallel, or occur multiple times. Also, the specific information collected in FIG. 3 is for illustration only. For instance, only a subset of the video, photographic, audio, and other data may be required for any particular asset being inspected. In addition, the association of data to an asset could occur at the data server 206 or other location after the data has been transmitted from the asset information collection device 100.

Figure 4:
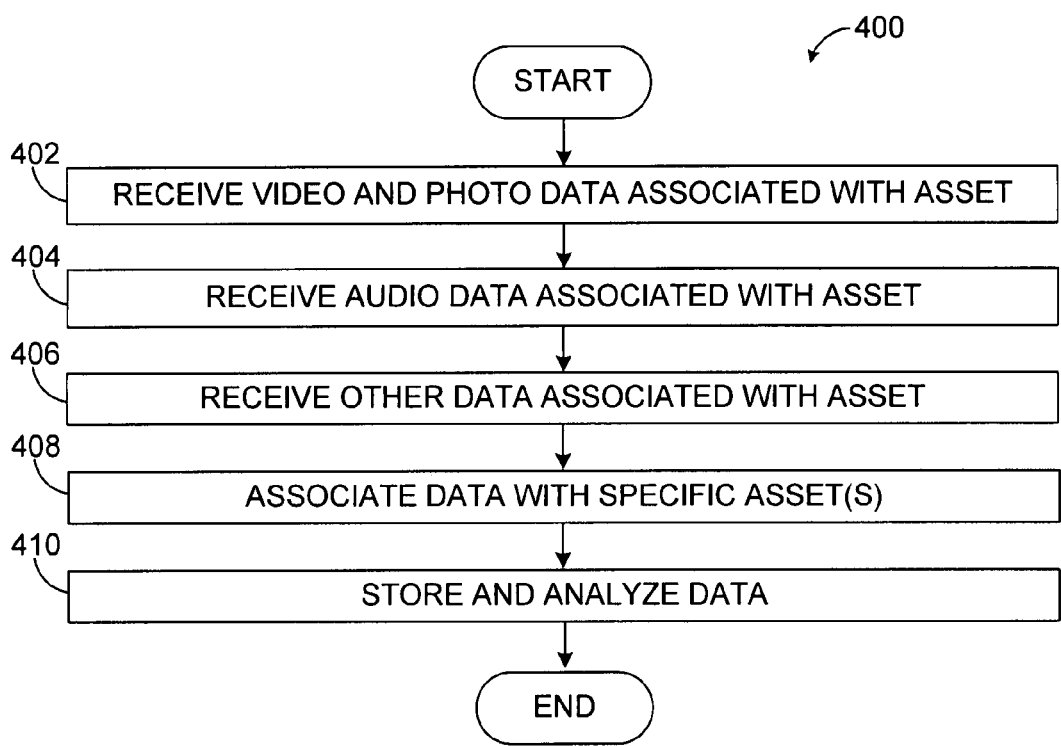
FIG. 4 illustrates an example method for collecting information from an asset information collection device according to one embodiment of this disclosure.

FIG. 4 illustrates an example method 400 for collecting information from an asset information collection device according to one embodiment of this disclosure. The embodiment of the method 400 shown in FIG. 4 is for illustration only. Other embodiments of the method 400 may be used without departing from the scope of this disclosure. Also, for ease of explanation, the method 400 is described with respect to the asset information collection device 100 of FIG. 1 operating in the system of FIG. 2. The method 400 could be used with any other suitable device and in any other suitable system.

Video and photo image data associated with an asset is received at step 402, audio data associated with the asset is received at step 404, and other data associated with the asset is received at step 406. This may include, for example, the data server 206 receiving the data from an asset information collection device 100 via one or more transceivers 202a-202n. In particular embodiments, the data could be transmitted in real-time or near real-time.

The received data is associated with one or more specific assets at step 408. This could include, for example, the data server 206 receiving information identifying a user's association of the data to specific assets. This could also include the data server 206 receiving information from another source and automatically associating the data with the assets. The other source could, for example, represent information from an RFID tag on the asset being inspected, an enterprise resource planning (ERP) system, a maintenance management system, EXPERIONS's Entreprise Model, ASSET MANAGER PKS, or HONEYWELL DVM.

At this point, the data is stored and analyzed at step 410. This could include storing the data in the database 208. The storage could occur in any suitable manner. For example, the image, audio, and other data could be stored separately or together. The analysis of the data could involve any suitable analysis, such as an application analyzing the data to schedule maintenance for assets, identify problems with assets, or confirm inspections were completed. The results of the analyses could be presented in any suitable manner, such as a graphical display or printed report.

Although FIG. 4 illustrates one example of a method 400 for collecting information from an asset information collection device, various changes may be made to FIG. 4. For example, while shown as a series of steps, various steps in FIG. 4 could overlap, occur in a different order, occur in parallel, or occur multiple times. As a particular example, the various steps in FIG. 4 could be repeated multiple times over a period of time (such as days, weeks, months, or years). This may allow many different video sequences, photographs, and audio recordings associated with an asset to be historized over an extended period of time.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   at least one image capture unit configured to capture images of assets;
   a sound capture unit configured to capture audio information associated with the assets;
   a controller configured to associate the captured images and audio information with particular ones of the assets; and
   at least one interface configured to wirelessly transmit (i) the captured images and audio information and (ii) information identifying the associations of the captured images and audio information with the particular assets, wherein the captured images and audio information are used by at least one data server to remotely identify at least one characteristic or problem associated with the assets;
   wherein the at least one interface is further configured to receive radio frequency identification (RFID) information from asset tags identifying the particular assets.

2. The apparatus of claim 1, wherein the controller is configured to associate the captured images and audio information with the particular assets based on input from a user.

3. The apparatus of claim 1, wherein:
   the apparatus further comprises a speaker; and
   the controller is further configured to:
      receive first voice data from the sound capture unit and provide the first voice data to the at least one interface for wireless transmission; and
      receive second voice data from the at least one interface and provide the second voice data to the speaker.

4. The apparatus of claim 1, wherein the controller is further configured to receive additional information associated with the assets from the at least one interface.

5. The apparatus of claim 4, wherein the additional information comprises test readings from a non-destructive testing instrument, the at least one interface configured to communicate with the non-destructive testing instrument.

6. The apparatus of claim 1, further comprising:
   one or more controls configured to provide input to the apparatus from a user.

7. The apparatus of claim 6, wherein:
   the one or more controls comprise a touch-sensitive display configured to receive the input from the user; and
   the input comprises at least one of: (i) annotations drawn on the images presented on the display and (ii) selections of assets in a list presented on the display, the selections identifying the associations of the captured images and audio information with the particular assets.

8. The apparatus of claim 1, wherein:
   the at least one image capture unit is configured to capture photographic images and video images;
   the sound capture unit is configured to capture one or more oral notes from a user inspecting the assets; and
   the at least one interface comprises a wireless transceiver.

9. A method comprising:
   capturing images and audio information associated with multiple assets;
   associating the captured images and audio information with particular ones of the assets;
   receiving radio frequency identification RFID information from asset tags identifying the particular assets;
   wirelessly communicating (i) the captured images and audio information and (ii) information identifying the associations of the captured images and audio information with the particular assets;
   wherein the method is performed using at least one processing device; and
   wherein the captured images and audio information are used by at least one data server to remotely identify at least one characteristic or problem associated with the assets.

10. The method of claim 9, wherein associating the captured images and audio information with the particular assets is based on input from a user.

11. The method of claim 9, further comprising:
    receiving first voice data from a user and wirelessly communicating the first voice data; and
    wirelessly receiving second voice data and providing the second voice data to the user.

12. The method of claim 9, further comprising wirelessly receiving additional information associated with the assets and associating the additional information with particular ones of the assets.

13. The method of claim 12, wherein wirelessly receiving the additional information comprises wirelessly receiving test readings from a non-destructive testing instrument.

14. The method of claim 9, further comprising:
    receiving input from a user using a touch-sensitive display;
    wherein the input comprises at least one of: (i) annotations drawn on the images presented on the display and (ii) selections of assets in a list presented on the display, the selections identifying the associations of the captured images and audio information with the particular assets.

15. A non-transitory computer readable medium embodying a computer program, the computer program comprising computer readable program code for:

capturing images and audio information associated with multiple assets;

associating the captured images and audio information with particular ones of the assets;

receiving radio frequency identification (RFID) information from asset tags identifying the particular assets; and initiating wireless communication of (i) the captured images and audio information and (ii) information identifying the associations of the captured images and audio information with the particular assets, wherein the captured images and audio information are used by at least one data server to remotely identify at least one characteristic or problem associated with the assets.

16. The computer readable medium of claim 15, wherein the computer readable program code for associating the captured images and audio information with the particular assets comprises computer readable program code for making the associations based on input from a user.

17. The computer readable medium of claim 15, further comprising computer readable program code for:

receiving first voice data from a user and initiating wireless communication of the first voice data; and receiving second voice data and providing the second voice data to the user.

18. The computer readable medium of claim 15, further comprising computer readable program code for:

associating additional information that is received wirelessly with particular ones of the assets.

19. The computer readable medium of claim 18, wherein the additional information comprises test readings from a non-destructive testing instrument.

20. The computer readable medium of claim 15, further comprising computer readable program code for:

receiving input from a user using a touch-sensitive display, the input comprising at least one of: (i) annotations drawn on the images presented on the display and (ii) selections of assets in a list presented on the display, the selections identifying the associations of the captured images and audio information with the particular assets.

21. A method comprising:

receiving images and audio information associated with assets;

associating the received images and audio information with specific ones of the assets;

receiving radio frequency identification (RFID) information from asset tags identifying the specific ones of the assets; and storing the images and audio information in association with the specific ones of the assets;

wherein the method is performed using at least one processing device; and wherein the captured images and audio information are used by at least one data server to remotely identify at least one characteristic or problem associated with the assets.

22. The method of claim 21, wherein associating the received images and audio information comprises using input from a user.

23. The method of claim 21, wherein associating the received images and audio information comprises using information from one or more identification tags associated with the assets.

24. The method of claim 21, wherein multiple images and multiple audio information are associated with each asset.

* * * * *